Aug. 14, 1934.　　　　S. E. SPERRY　　　　1,970,527
QUADDING AND CENTERING DEVICE FOR TYPOGRAPHICAL MACHINES
Filed May 19, 1932　　　7 Sheets-Sheet 1

INVENTOR
Samuel E. Sperry
BY
ATTORNEY

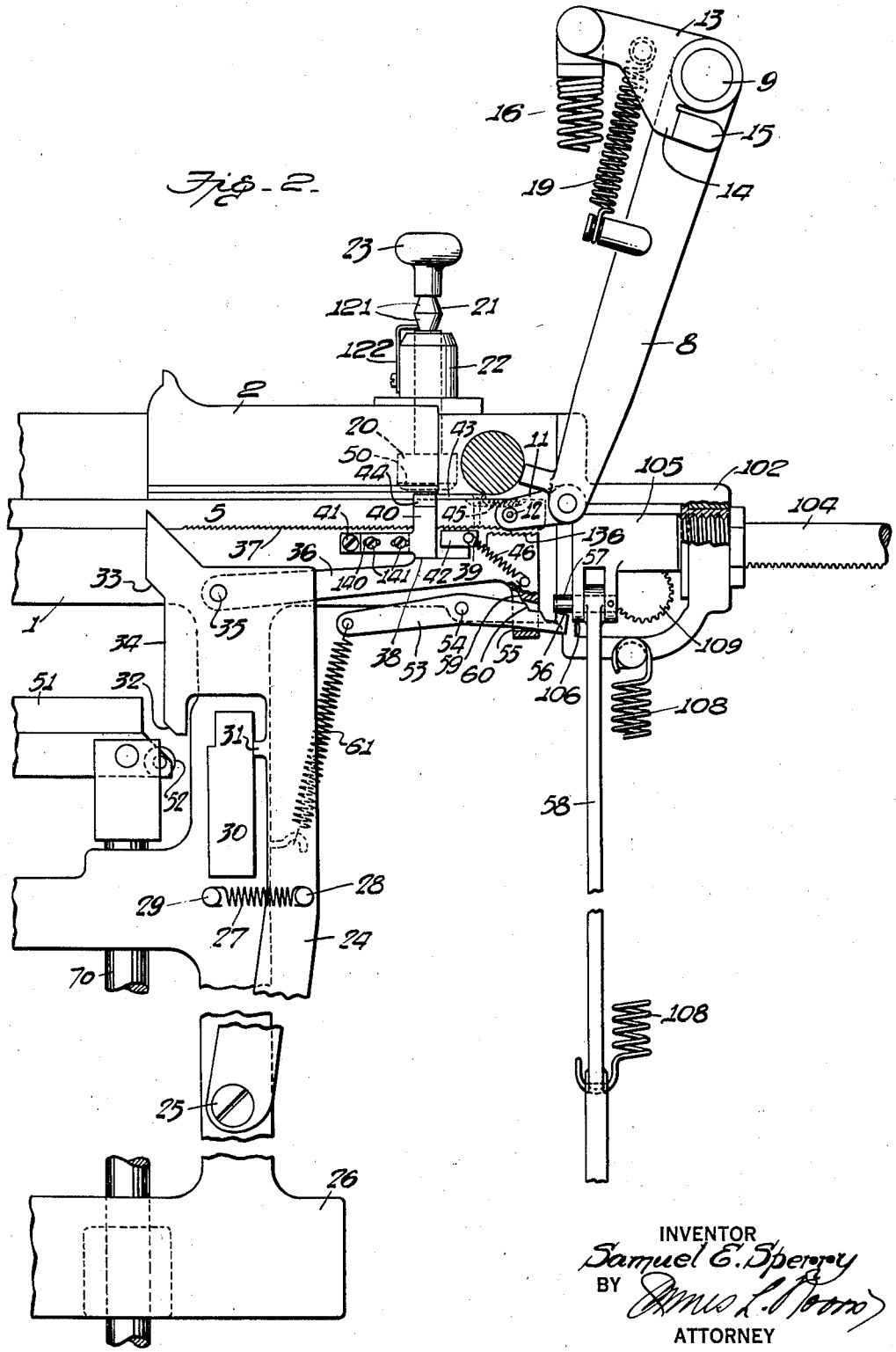

Aug. 14, 1934. S. E. SPERRY 1,970,527
QUADDING AND CENTERING DEVICE FOR TYPOGRAPHICAL MACHINES
Filed May 19, 1932 7 Sheets-Sheet 3
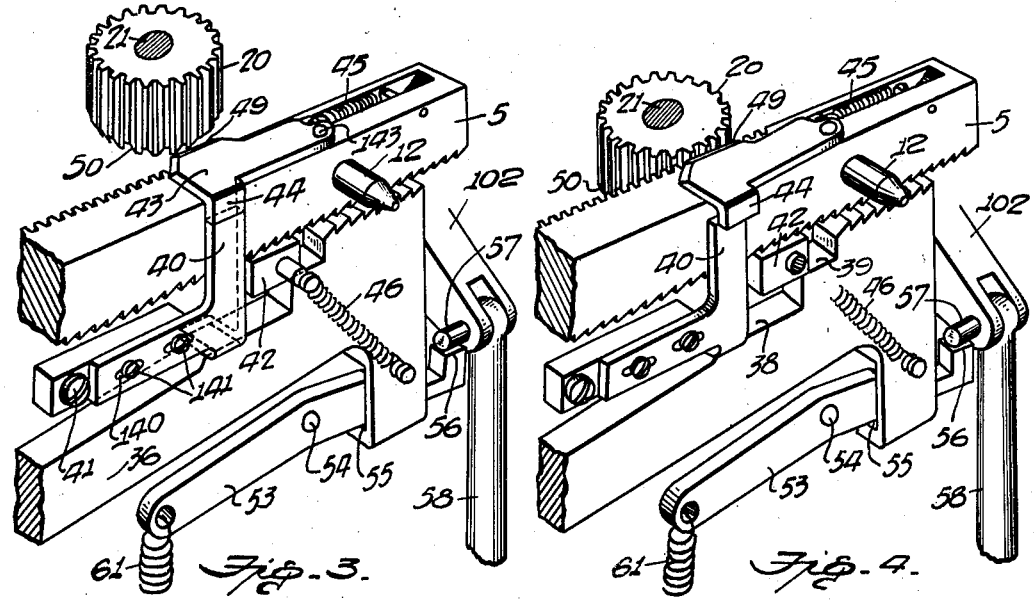
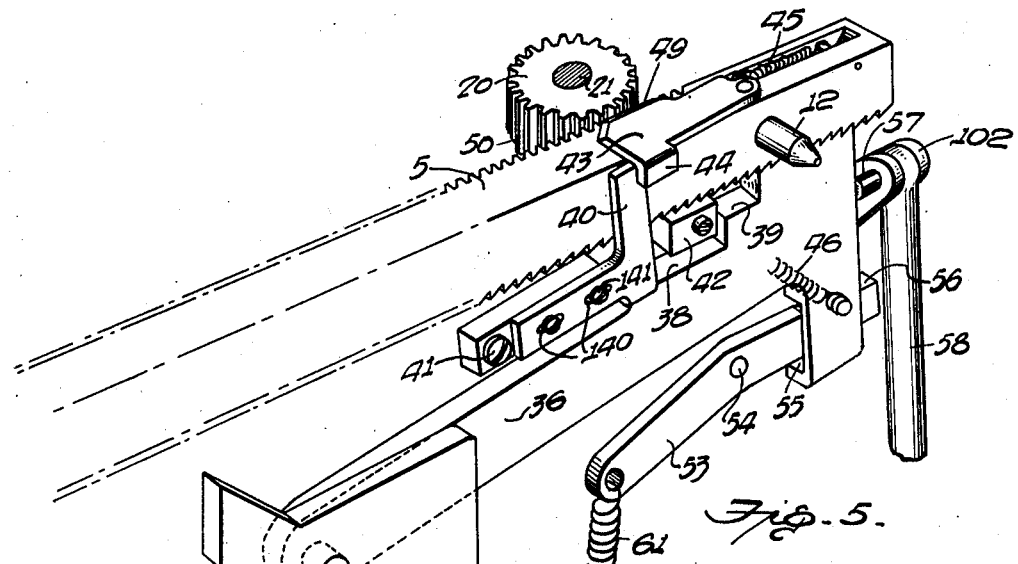
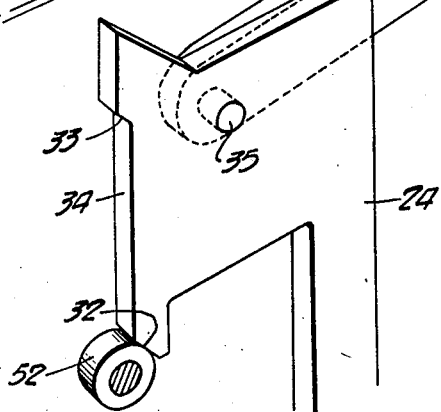
INVENTOR
Samuel E. Sperry
BY
ATTORNEY Aug. 14, 1934.                    S. E. SPERRY                    1,970,527
         QUADDING AND CENTERING DEVICE FOR TYPOGRAPHICAL MACHINES
                        Filed May 19, 1932        7 Sheets-Sheet 4
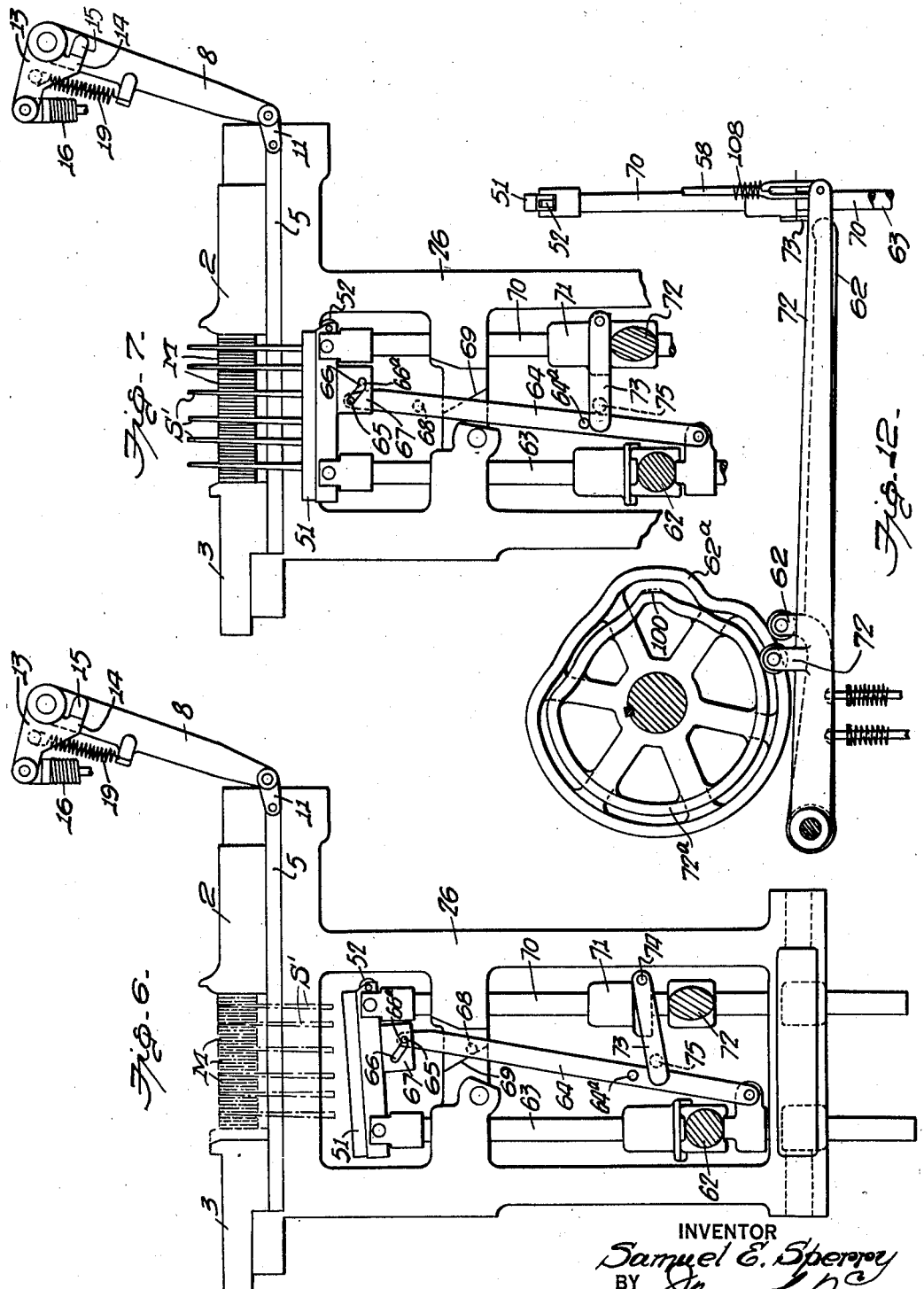
INVENTOR
Samuel E. Sperry
BY
ATTORNEY

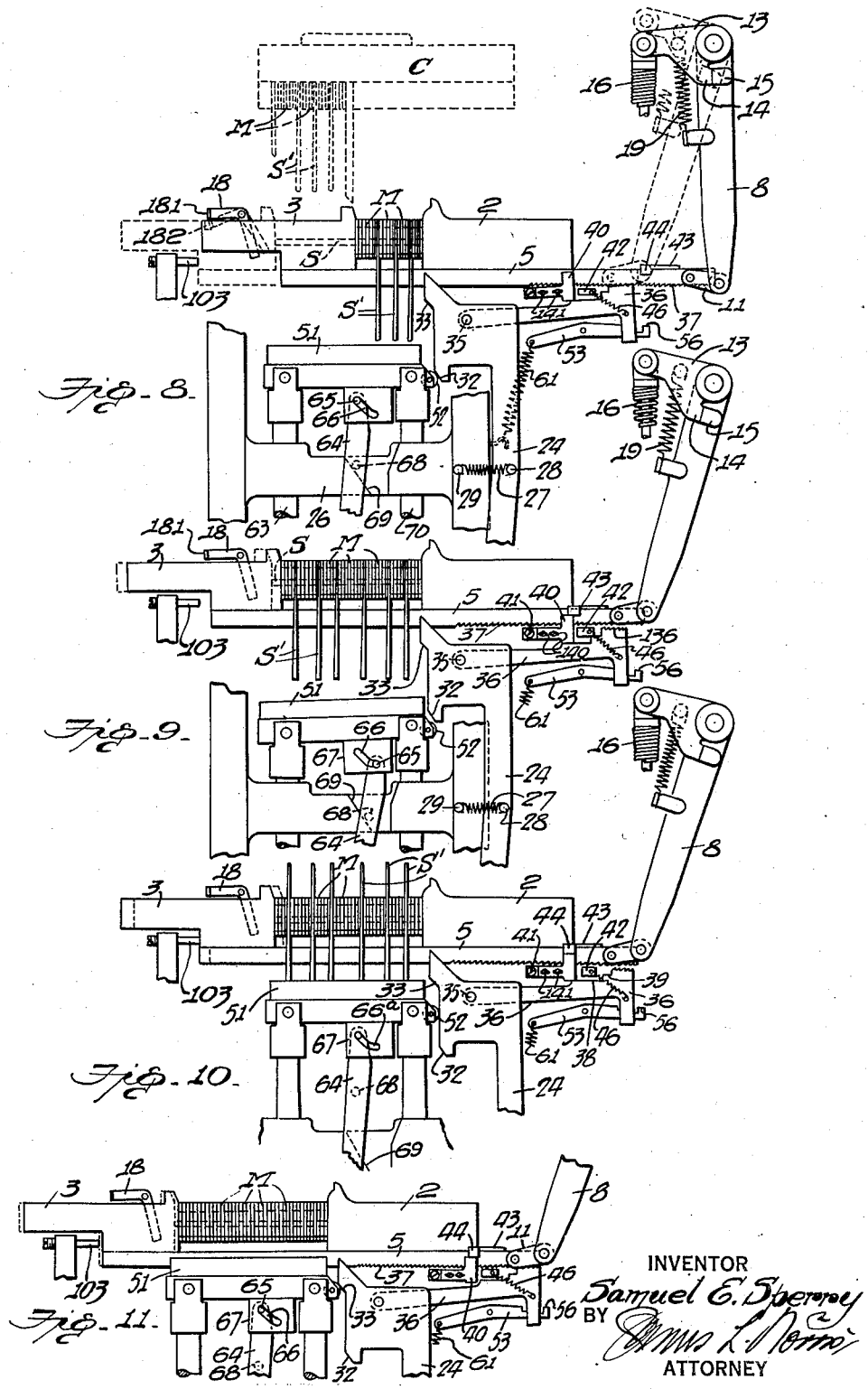

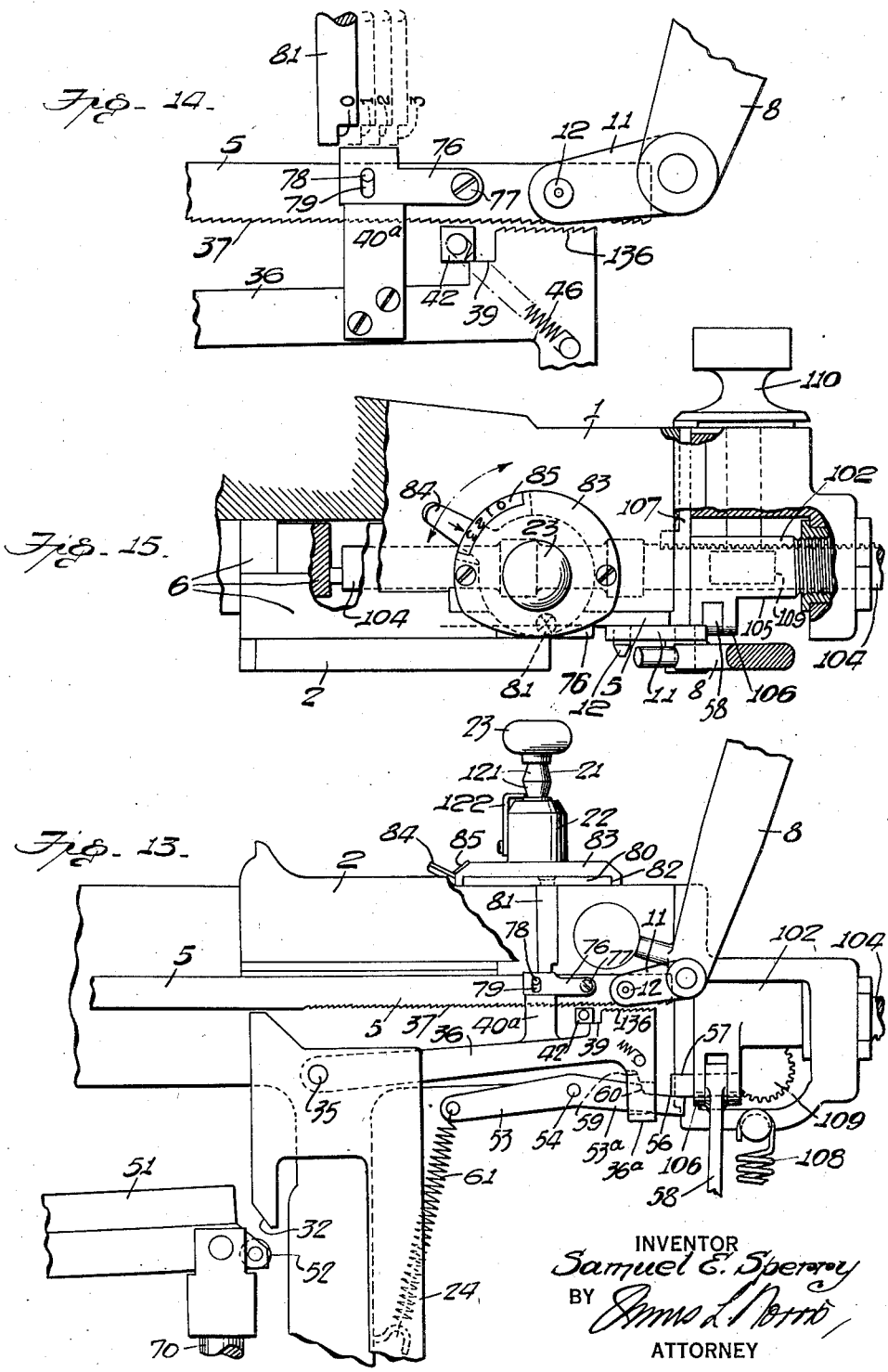

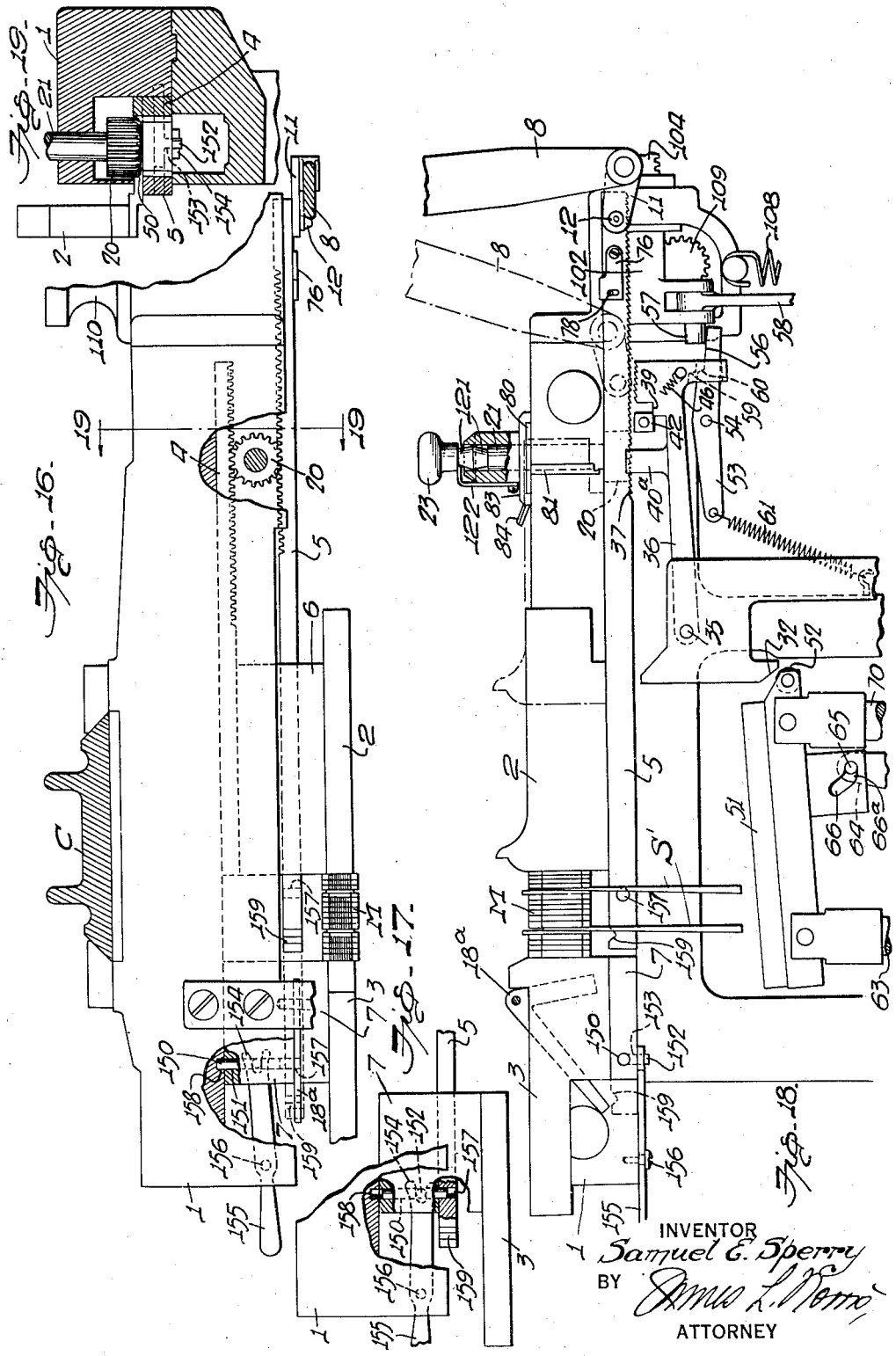

Patented Aug. 14, 1934

1,970,527

UNITED STATES PATENT OFFICE 1,970,527

QUADDING AND CENTERING DEVICE FOR TYPOGRAPHICAL MACHINES

Samuel E. Sperry, Hollis, N. Y., assignor to Intertype Corporation, Brooklyn, N. Y., a corporation of New York Application May 19, 1932, Serial No. 612,349

30 Claims. (Cl. 199—50)

This invention relates to improvements in devices for automatically quadding and centering lines of matrices composed in typographical machines for the casting of type slugs therefrom, and it is more particularly an improvement upon such devices as shown for example in my prior applications, Serial No. 562,390 filed September 11, 1931, and Serial No. 574,003 filed November 9, 1931.

One of the primary objects of the present invention is to provide a novel and improved quadding and centering device for machines of this class which will have a wider range of flexibility or usefulness and which embodies control means which enables the machine to fulfill the requirements of a greater variety of composition and also to increase the speed of the machine and facilitate the production of type slugs thereby.

Another object is to provide novel means for coordinating the elements and actions of the quadding and centering device with the usual elements and actions of the machine whereby a simple or fundamental adjustment or setting of the control means for such device, determined in accordance with the nature of the particular composition to be done, will relieve the operator of further attention to the varying lengths of lines sent in to be cast, thus enabling full lines and lines which are to be quadded or centered to be composed in any succession or relative order, substantially without interruption.

The invention also provides improved justifying means which further contributes to the accomplishment of the above stated results.

In the accompanying drawings:

Fig. 2 is a rear elevation, on an enlarged scale, of portions of the vise mechanism and the justifying mechanism of such machine, the quadding and centering device according to the present invention being shown applied thereto;

Fig. 3 is a detail perspective view, on a further enlarged scale, of the quadding and centering device as viewed from the rear, the same being shown in normal position and set for full or quadded lines;

Fig. 4 is a view similar to Fig. 3 but showing the device set for centering lines;

Fig. 5 is a view similar to Fig. 4 but showing the parts actuated to clamp and lock a centered line;

Fig. 6 is a rear elevation of the improved justifying means, the same being shown in normal or retracted position prior to the first justification;

Fig. 7 is a view similar to Fig. 6 but showing the justifying means in actuated position to effect the second justification;

Fig. 8 is a diagrammatic view of the vise mechanism, the justifying mechanism and the quadding and centering device as viewed from the rear, showing a short line of matrices and spacebands quadded and clamped between the vise jaws immediately prior to justification;

Fig. 9 is a view similar to Fig. 8, but showing a full measure line of matrices and spacebands between the vise jaws and closed thereby, prior to justification;

Fig. 10 is a view similar to Fig. 9 but showing the parts in the positions which they occupy after the matrix line has been justified and expanded to full line measure;

Fig. 11 is a view similar to Fig. 10, but showing a line of matrices without spacebands clamped and locked between the vise jaws;

Fig. 12 is a view in side elevation of the justification and vise closing cams of the machine and their cooperating levers, the vise closing cam being shown modified to adapt it for use in carrying out the present invention;

Fig. 13 is a view similar to Fig. 2 but showing another embodiment of the invention employing a readily accessible setting or control device;

Fig. 14 is an elevation on an enlarged scale, of the improved setting or control device, the same being shown diagrammatically in different set positions;

Fig. 15 is a top plan view, partly in section, of a portion of the structure shown in Fig. 13;

Fig. 16 is a top plan, partly in section, of the vise mechanism, showing another embodiment of the invention whereby quadding out of the left hand ends of lines as well as the right hand ends thereof and centering of the lines may be accomplished;

Fig. 17 is a detail view, partly in section, of a portion of the structure shown in Fig. 16, showing control means for one of the jaws;

Fig. 18 is a rear elevation of the vise mechanism and the quadding and centering means shown in Fig. 16, showing portions of jaw closing means and the justifying means for effecting the clamping and locking of the matrix lines; and Fig. 19 is a transverse vertical section taken on the line 19—19 of Fig. 16 and showing another embodiment of the racks and pinion for connecting the jaws.

Figure 1:
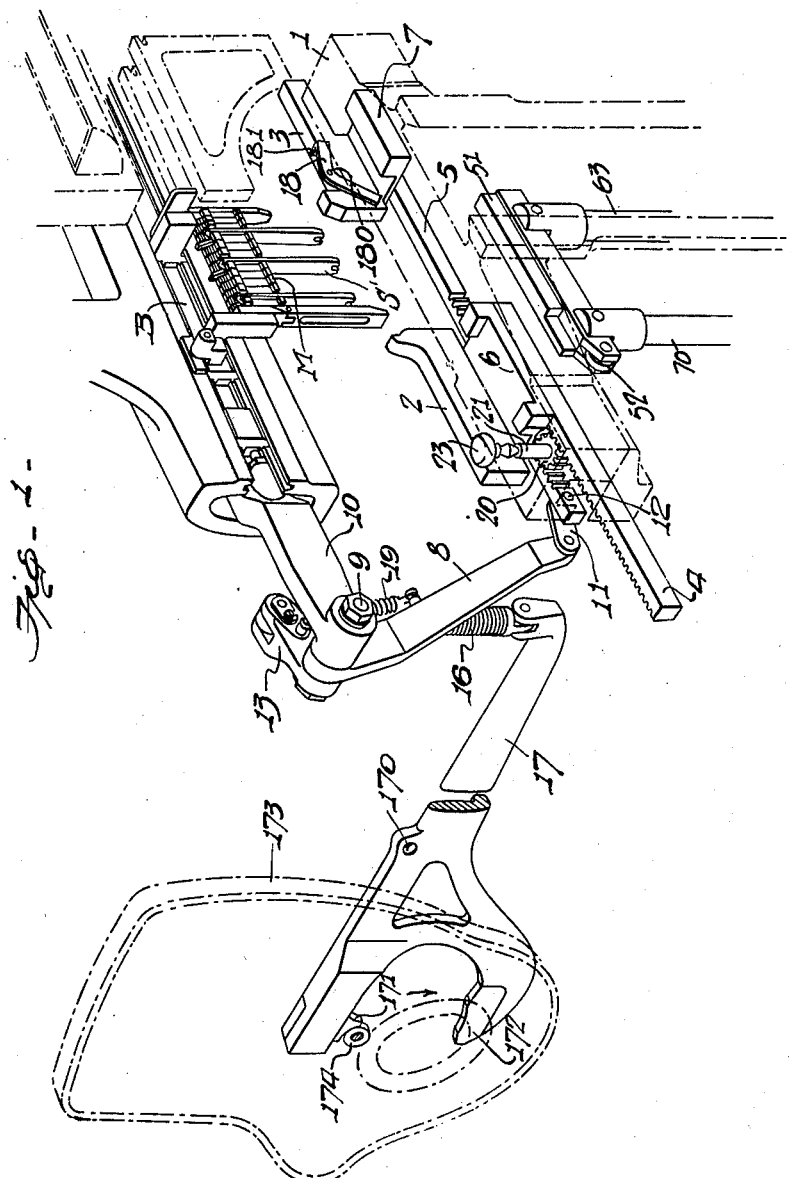
Fig. 1 is a perspective view of a portion of a typographical machine of well known class constructed in accordance with the present invention.

The invention is shown applied to a typographical machine of well known class in which matrices or matrices and spacebands, delivered from their places of storage by manipulation of a keyboard, are assembled in a line as usual in an assembling elevator which is then lifted so that the line will be received by a line delivery slide B which latter transfers the line to a so-called first elevator C, the latter then descending as usual to lower the line to vise mechanism which clamps the line in front of a mold for the casting of a type slug therefrom. The vise mechanism shown comprises the usual vise cap 1 and left hand and right hand vise jaws 2 and 3 respectively, these vise jaws being rigidly secured to respective jaw supporting blocks 6 and 7 which are guided to slide toward and from one another in a suitable groove in the vise cap, in the usual manner.

Mechanism generally similar to that shown in my above noted prior applications is provided for automatically moving one or both of the vise jaws to close against short matrix lines for quadding out the unfilled portion thereof and for returning them to open or normal position after a type slug has been cast from the line confined between them, and such mechanism also embodies means for closing the vise jaws against a line to center it with respect to the slug casting mold, such jaw closing and centering mechanism as shown comprising a pair of toothed extensions or rack bars 4 and 5 which are rigidly secured to the supporting blocks 6 and 7 of the respective jaws 2 and 3, and jaw closing means which, in the present construction, comprises a lever 8 which is pivoted at its upper end of a shaft 9 mounted in a bracket 10 fixed to a stationary part of the machine frame so that the lower end of the lever 8 will swing horizontally in approximate alignment with the rack bar 5 attached to the right hand jaw 3, the lower end of this lever being pivotally connected to a link 11 and the latter being pivotally connected by the pivot pin 12 to the left hand end of the rack bar 5. A lever 13 is also pivoted on the shaft 9, this lever having a projection 14 thereon arranged to bear against a lug 15 on the lever 8. A tension spring 16 is connected at its upper end to the lever 13 and at its lower end to the forward end of a vertically movable lever 17, the latter being pivoted at 170 to rock in a vertical plane and being provided at its rear end with a fork which straddles the main cam shaft of the machine, one branch of the fork having an inwardly projecting block 171 thereon and the other branch of the fork having an inwardly projecting portion 172, the hub of the usual first elevator operating cam 173 carrying a roller 174 which, during the usual rotation of the cam shaft incident to the casting operation of the machine, engages the projection 171 and, while passing it, momentarily rocks the lever 17 about its pivot 170 and lowers the forward end of the lever 17, thereby tensioning the spring 16. The jaw 3 is normally held in its retracted or full line receiving position by a latch 18 which is pivoted at 180 on the vise cap 1, this latch having a dog 181 at one end to engage in a notch or recess 182 in the jaw 3, and the other end of this latch is in the path of the respective end of the first elevator C, so that when the latter descends, said end thereof will engage the latch 18 and rock it into position to release the jaw 3, and such release of this jaw, which takes place while the roller 174 is acting on the block 171 to apply tension to the spring 16, causes the levers 13 and 8, the projection 14 and lug 15 of which are then in engagement, to swing in a direction to move the jaw 3 toward the jaw 2, and immediately after the roller 174 has passed the block 171, the tension applied to the spring 16 is relieved. Upon further rotation of the main cam shaft, the roller 174 comes into engagement with the portion 172 on the lever 17 and acts thereon to swing the forward end of said lever upwardly, thereby closing the coils of the spring 16 or compressing it and thus swinging the lever 13 in an opposite direction about the shaft 9. A tension spring 19 is connected at its ends to the levers 8 and 13 respectively, it acting to urge the projection 14 on the lever 13 against the lug 15 on the lever 8, but the ascent of the forward end of the lever 17 and the consequent compression of the spring 16 as described, and which takes place after release of the locking means to be hereinafter described which holds the jaw 3 in closed position against the line during the casting operation, causes the spring 19 to swing the lever 8 about the shaft 9, in unison with the swing of the lever 13, or substantially so, and thereby returns the jaw 3 to its normal fully opened position, the spring 19 in conjunction with the projection 14 and lug 15, providing an overmotion connection between the levers 8 and 13 during the return of the jaw 3 to normal position.

The means provided for moving both vise jaws into closing position against a line to be centered with respect to the slug casting mold comprises a pinion 20 which, in the present construction, is fixed to the lower end of a shaft 21, the latter extending upwardly through the vise cap and being revolubly fitted in a housing 22 fastened to the top of the vise cap, the upper end of the shaft 21 having a knob 23 fixed thereon which is exposed above the vise cap and housing 22 in position for convenient manipulation, the knob being lifted to disengage the pinion 20 from the rack bars 4 and 5 and being lowered to bring it into engagement simultaneously with both of said rack bars. The pinion shaft 21 is provided with reversely arranged conical portions 121 to cooperate with a spring 122 which may be fixed to one side of the housing 22 so that the free end of this spring in cooperation with the respective conical portions 121 on the pinion shaft 21 will retain the knob 23 and the pinion connected thereto in either raised or lowered position, it being understood that the pinion 20 will be set in its lowered position and in engagement with the rack bars 4 and 5 when a line is to be centered with respect to the casting mold, the pinion, while in such position, causing both vise jaws 2 and 3 to move equal distances toward and from one another, the closing and opening movements of the jaw 3 under the action of the lever 8 being transmitted to the jaw 2 through the pinion 20, and when the knob 23 and the pinion 20 connected thereto are in raised position, as when quadding, the jaw 3 alone will be closed and opened by the lever 8 under the action of its operating means hereinbefore described. The left hand jaw 2, while in its fully opened position, rests against the left hand jaw closing means such as that commonly used in machines of this class, such jaw closing means 102 as shown in the present instance being of the form disclosed in U. S. Letters Patent No. 1,108,758, granted August 25, 1914, such jaw closing means serving to move the left hand jaw toward the right hand jaw to close against the leading or left hand end of the line and to accurately gauge the position of such end of the line according to the line measure to be used, as usual, and to set the left hand vise jaw 2 for different line measures. As shown most clearly in Fig. 15, the left hand vise jaw closing device comprises a toothed bar 104 to support the left hand jaw 2 during justification and casting from full length or quadded lines, a threaded sleeve 105 having a crank arm 106 to which the actuating rod 58 is connected, and a dog 107 engageable with teeth along the bar 104, the construction being such that when the crank arm 106 is rotated upwardly by an upstroke of the rod 58, the threaded sleeve 105 will act through the dog 107 to force the inner end of the bar 104 inwardly against the jaw block 6 and thereby close the left hand jaw 2 against the line and lock it in such position during justification of and casting from full length lines, the bar 58 being urged upwardly by a spring 108 and being controlled by the vise closing cam of the machine. The vise closing device also comprises a pinion 109 which meshes with rack teeth on the bar 104 for setting said bar and the left hand jaw 2 for different line measures, such being permitted by disengaging and re-engaging the dog 107 with respect to the bar 104 by axial movement of the knob 110 attached to the pinion shaft and connected to said dog so that the latter will move axially therewith. The right hand vise jaw 3, while in its normal or fully opened position, rests against the usual right hand vise jaw stop 103, it being understood that when lines of less than full line measure for which the vise jaws are set are received between the jaws to be quadded or centered, the jaw or jaws will be moved inwardly from their normal or full line positions to close against the line. It will also be understood that the end or ends of the slug casting cavity (indicated at S in Fig. 8), not covered and closed by the matrix line, will be covered and thereby closed by the rear faces of the vise jaws when the latter are moved inwardly from their normal fully opened positions.

The present invention provides improved means for locking the right hand jaw 3 against matrix lines of less than full length or line measure, that is, any lines which are too short to justify to the full length of the line measure being set, whether or not such lines contain the usual wedge or expansible spacebands. As shown more particularly in Fig. 2, the improved locking means comprises a lever 24 which is pivotally mounted by a screw 25 toward the lower end of the usual vise frame 26 and a tension spring 27 the ends of which are attached to pins 28 and 29 on the lever 24 and vise frame 26 respectively, the vise frame having a block 30 which projects forwardly therefrom and the lever 24 having a lug 31 thereon arranged to engage the block 30 as the lever 24 swings under the tension of the spring 27 and thereby serving as a stop to limit the swing of said lever. The upper end of the lever 24, as shown in Fig. 2, is provided with an enlargement and the edge of this enlargement toward the justifying mechanism of the machine is provided with lower and upper inclined or cam surfaces 32 and 33 and an intervening flat surface 34 which leads from the high point of the cam surface 32 to the low point of the cam surface 33. A pawl 36 is pivoted at 35 to the lever 24 at a point near its upper end, this pawl having toward its free end and its upper side teeth 136 which are movable into and out of engagement with teeth or serrations 37 arranged along the lower edge of the rack bar 5 attached to the right hand jaw 3, as the pawl 36 swings vertically about its pivot 35. The pawl 36 is provided on its upper edge with steps or banking surfaces 38 and 39, the step 38 being arranged to bear against the lower edge of a stop 40 which is pivoted by the stud or screw 41 to the vise cap, the stop 40 being made in two parts one having slots 140 and the other having screws 141 secured therein and extending through said slots so that the free or active portion of this stop is adjustable in the direction of movement of the vise jaws, and the step 39 on the pawl 36 is arranged to bear against the underside of a stop block 42 which is rigidly secured to the vise cap. A stop pawl 43 is pivotally mounted by the pivot pin 143 fixed in the top of the rack bar 5 so that the pawl 43 will swing horizontally and in a direction transversely of the length of this rack bar, and the stop pawl 43 has a downwardly extending lug 44 thereon which is movable into and out of a position above the stop 40, as shown in Figs. 3 and 4 respectively, a tension spring 45 attached to the rack bar 5 and to the stop pawl 43 respectively acting normally to urge the lug 44 against the side of the rack bar and into a position above the stop 40. A tension spring 46, attached at one end to the block 42 and at its other end to the pawl 36, urges the latter upwardly so that the step 38 on the pawl will be held against the underside of the stop 40 and the latter will be held against upward movement by the lug 44 on the stop pawl 43 when said lug is above the stop 40, and the spring 46 also acts to hold the step 39 on the pawl 36 against the underside of the block 42, movement of the toothed end of the pawl 36 into engagement with the cooperative teeth 37 on the rack bar 5, under the action of the spring 46, being controlled by the stop 40 in cooperation with the lug 44, and by the stop block 42. The stop pawl 43 is located at such a point in the length of the rack bar 5 that when the right hand jaw 3 to which this rack bar is attached is in its normal or fully opened position against the stop 103, the pawl 43 will be opposite to the pinion 20, and the edge of the stop pawl 43 toward said pinion is bevelled at its upper side as indicated at 49 and the lower edge of the pinion 20 is correspondingly bevelled as indicated at 50, the pawl 43 being sufficiently wide to overlie the edge of the rack bar 5 toward the pinion when the lug 44 is in engagement with the opposite side of said rack bar so that when the pinion is shifted from its upper position shown in Fig. 3 to its lowered position, as shown in Fig. 4, the bevelled edges of the pinion and pawl 43 will cooperate to cause deflection of the pawl 43 out of the path of the pinion and to shift the pawl 43 so as to carry the lug 44 thereon from a position above the stop 40 as shown in Fig. 3 to a position where it will clear the stop 40 as shown in Fig. 4, the pinion being thus permitted to engage the cooperating teeth on the rack bars 4 and 5 and to thereby connect the respective jaws 2 and 3 for centering, and the stop 40, by the same operation, being freed from control by the stop pawl 43.

The justification bar 51, which is similar to that commonly used in machines of this class for forcing the spacebands upwardly in the lines to fill out and justify the same, is provided at one end with a roller 52, this roller moving vertically with the justification bar 51 and travelling in a path which will cause it to ride upon the cam surfaces 32, 33 and 34 on the inner or adjacent side of the lever 24 and, in so doing, to swing the lever 24 and the toothed pawl 36 about the pivot 25 and against the action of the spring 27.

A retaining latch 53 for the pawl 36 is pivoted at 54 to the vise cap, one arm of this latch at one side of its pivot extending through a recess 55 formed in a downwardly extending portion of the pawl 36 so that this portion of the latch may move vertically in such recess, and the end of this portion of the latch 53 is formed with a shoulder 56 which lies in the path of the pin 57 which connects the left hand vise closing device 102 to its vertically movable actuating rod 58, as disclosed in the above noted Patent No. 1,108,758. The recess 55 in the pawl 36 has an inclined upper wall 59, and the upper edge of the latch 53 is formed with a correspondingly inclined surface 60 to engage the wall 59, and a tension spring 61, connected at one end to the vise frame and at its other end to the latch 53, acts on the latter to urge the inclined surface 60 on the latch 53 into engagement with the inclined wall or surface 59 on the pawl 36, engagement of these inclined surfaces being permitted while the pin 57 is in raised position clear of the shoulder 56 on the latch and while the pawl 36 is shifted toward the right in Fig. 2 so that the step 39 thereon clears the stop block 42, as shown in Fig. 5.

The latch 53 is controlled by the vise closing cam 72ª and cooperating lever 72 on the machine, the lever 72 controlled by the vise closing cam being connected in the usual way to the rod 58 which actuates the left hand vise closing device 102, and in order to enable the usual vise closing cam on machines of this class to control the latch 53 according to the present invention, such cam, as shown in Fig. 12, is altered so that the high point 100 thereon which acts to open the vise closing device by drawing the rod 58 downwardly between the first and second justifying actions, is reduced in height below its usual height indicated by the dotted lines in this figure, so that during the first justifying action, the rod 58 moves upwardly, carrying the pin 57 clear of the shoulder 56 on the latch 53, thereby permitting the latch 53 to swing under the action of the spring 61 to bring its inclined surface 60 into engagement with the correspondingly inclined surface 59 on the latch 36, following which the rod 58 is drawn downwardly by the vise closing cam, but due to the reduction in the height of its raised portion 100 as described above, the pin 57 will not move downwardly sufficiently far to depress the latch 53 to an extent to cause complete disengagement of the surfaces 59 and 60 although the latch 53 will be depressed under the action of the pin 57 to an extent that will cause partial retraction of the inclined surface 60 on the latch from the correspondingly inclined surface 59 on the pawl 36 so that the locking pressure produced by the pawl 36 on the vise jaw or jaws through the engagement of the teeth 136 on the pawl 36 with the teeth 37 on the rack bar 5 will be somewhat relaxed, and during the following second justification, the pin 57 will be raised out of engagement with the shoulder 56 on the latch 53, so that the inclined surfaces 59 and 60 restore the locking pressure of the pawl 36 with respect to the vise jaw or jaws, through the tension of the spring 61. The latch 53 thus acts to retain the pawl 36 against disengagement from the rack 5 while the locking pressure on the line is relaxed between the first and second justifications, although permitting such relaxation of locking pressure on the line at such time and restoring the locking pressure for the casting operation.

The justifying mechanism provided by the present invention, as shown in Figs. 6 and 7, differs from the justifying mechanism usually used in machines of this class in that the justification bar 51 slopes in the opposite direction to that which is customary, while in normal or idle position as shown in Fig. 6, and after the justification of the line has been completed, this bar stands horizontally. This difference in the action of the justification bar arises from the fact that in the usual machine not arranged for quadding, the right hand vise jaw is fixed, or substantially so, and the drive of the justification bar against the wedges of the spacebands expands the line in a direction from right to left, whereas, according to the present invention, the right hand jaw 3 is movable for quadding and the drive of the justification bar 51 against the wedges of the spacebands expands the line against the movable right hand jaw 3 or in a direction from left to right, and the bar 51 is therefore sloped downwardly from the end nearest the left hand jaw 2 to the end nearest the right hand jaw 3, it thereby allowing the lower ends of the wedges of the spacebands to creep along the downwardly sloping bar as they move toward the right hand jaw during justification.

The means for actuating the justification bar 51 in this manner comprises the usual first justification lever 62 which is controlled by the usual justification cam 62ª and operates in the usual manner on the vertically movable rod 63 which pivotally supports one end of the justification bar 51 and a bar 64 the lower end of which is pivotally connected to the rod 63 and is provided at its upper end with a pin 65 which is arranged to operate in an inclined cam slot 66 in a bracket 67 secured to the justification bar 51 toward its opposite end, the bar 64 also carrying a pin 68 which is arranged to ride upon an inclined surface 69 on the vise frame 26 during the descent of the justifying mechanism. The end of the justification bar 51 to which the bar 64 is attached is also pivotally connected to a vertically movable rod 70 having a collar 71 fixed thereon, this rod being actuated by the usual second justification lever 72 controlled by the vise closing cam 72ª. A lever 73 is pivoted at 74 to the collar 71 so that it may swing vertically when engaged by the justification lever 72 during its ascent, and the lever 73 is provided with a roller or projection 75 which is arranged to bear against the adjacent side of the bar 64, the upward swing of the lever 73 causing it to finally abut against a pin 64ª projecting from the adjacent side of the bar 64, as shown in Fig. 7. According to this arrangement, the rising of the first justification lever 62 causes the justification bar 51 to ascend and act upon the wedges of the spacebands while such bars is in the inclined position shown in Fig. 6, the end of the justification bar toward the jaw 2 being then supported in the raised position shown by the engagement of the pin 65 on the bar 64 in the lower horizontal end 66ª of the cam slot 66, and the justification bar 51 descends while still thus supported in such inclined position, during the downward movement of the justification lever 62. Prior to second justification, the second justification lever 72 rises and lifts the lever 73, thereby causing the roller 75 to swing the bar 64 so that the pin 65 on its upper end shifts from the lower end of the slot 66 as shown in Fig. 6 to the upper end of said slot as shown in Fig. 7, in consequence of which the end of the justification bar 51 toward the jaw 2 is lowered so that the justification bar assumes a horizontal position. Continued ascent of the lever 72 causes it to come into engagement with the collar 71 on the bar 70, and causes the lever 73 to come into engagement with the under side of the pin 64a on the bar 64, whereupon the lever 62 makes its second ascent in the manner customary in machines of this class, the concurrent ascent of the levers 62 and 72 then causing the justification bar 51 to rise while in the horizontal position shown in Fig. 7 to complete the second justification. During the rise of the bar 51 while in horizontal position to effect second justification, the bar 51, bar 64, rod 70 and lever 73 form a rigid frame, the lever 73 acting as a clamp to lock the bar 64 in the position shown in Fig. 7, and the pin 64a on the bar 64 will be pushed upwardly by the lever 73, thus rigidly locking the bar 51 in horizontal position during second justification even though the usual spring for lifting the lever 72 is stronger than that for lifting the lever 62, so that second justification will be insured by the lever 72 independently of the lever 62. The justification bar 51 and the levers 62 and 72 descend after the cast has been made from the line and during their descent, the lever 72 descends in advance of the lever 62 so that the lever 73 is released and may drop by gravity to the position shown in Fig. 6, and the projection 68 on the bar 64 rides against the inclined surface 69 on the vise frame, thereby causing the bar 64 to be swung back to the position shown in Fig. 6, thereby returning the pin 65 on the upper end of this bar to the lower end of the slot 66, the bar 51 thereby returned to its inclined position and the other parts of the justifying mechanism being thus restored to the position shown in Fig. 6.

The justification means described thus provides a rigid frame composed of the rod 63 and bar 64 on which the first justification lever 62 alone acts to lift the justification bar 51 while it is in inclined position during first justification, and it provides another rigid frame composed of the bar 64 and rod 70 and clamping lever 73 on which the second justification lever 72 acts during second justification to support and lock the justification bar 51 in horizontal position and to lift it while in such position.

The operation of the mechanism thus far described is as follows, reference being made to Figs. 8 to 11 inclusive, wherein M represents the usual matrices and S' the usual wedge or expansible spacebands as used in machines of this class:

Fig. 8, which shows the vise mechanism as viewed from the rear of the machine, illustrates by the dotted lines the usual first elevator C in its line receiving position and containing a short matrix line and by the full lines the short matrix line after it has been lowered into position between the vise jaws 2 and 3, the jaw 3, which is the right hand jaw on the machine, being shown by the dotted lines in its normal or fully opened position, and by the full lines, in closed position against the matrix line. Descent of the first elevator to lower the line between the vise jaws trips the retaining latch 18 for the jaw 3, thereby releasing this jaw, and the lever 8, which is then under the tension of the spring 16, swings from the dotted to the full line position shown in this figure, thereby moving the jaw 3 and also the matrix line toward the jaw 2, thus positioning the matrix line at the left hand end of the slot S of the slug casting mold in the machine, the portion of the mold slot not covered and closed by the matrix line being closed by the rear face of the jaw 3. The justification bar then makes its first ascent while in the inclined position shown in Fig. 6, but before this bar rises sufficiently to press upwardly on the wedges of the spacebands, if such are present in the line, the roller 52 contacts with the cam face 32 on the lever 24, thereby swinging this lever against the action of its spring 27, thus carrying the lug 31 away from its normal resting place against the stop 30 and also shifting the pawl 36 toward the right in Fig. 8 thereby carrying the step 39 on this pawl out of engagement with the stop block 42, and since the stop pawl 43 on the rack bar 5 attached to the jaw 3 has been carried sufficiently far to the right in this figure by the jaw closing action to clear the pivoted stop 40, the pawl 36, under the upward pull of its spring 46, is permitted to swing upwardly so that the teeth 136 thereon move into engagement with the rack teeth 37 on the rack bar 5. In the meantime, the vise closing rod 58 rises as usual under the action of its spring 108, causing the pin 57 to rise out of engagement with the shoulder 56 on the latch 53, so that the latch is then free to swing upwardly under the tension of its spring 61, thus causing the inclined surface 60 on the latch to come into engagement with the correspondingly inclined surface 59 on the pawl 36. The justification bar 51 now descends, carrying the roller 52 downwardly out of contact with the cam face 32 on the lever 24, but the engagement of the latch 53 with the pawl 36, as just described, prevents the lever 24 from swinging toward the left in Fig. 8, and the latch 53 consequently retains the pawl 36 in position so that its teeth 136 remain in engagement with the teeth 37 on the rack bar 5. During this descent of the justification bar 51, the vise closing rod 58 also descends in the manner usual in machines of this class, preparatory to the second justification, but, as hereinbefore described, the descent of the rod 58 between first and second justifications is somewhat less than that which ordinarily takes place, so that the pin 57 will not descend sufficiently far to cause complete disengagement of the latch 53 from the pawl 36 although the pin 57 will rock the latch 53 to cause sufficient relative motion between its inclined surface 60 and the similarly inclined surface 59 on the pawl 36 to permit a slight receding movement of the pawl 36 which will slightly relax the locking pressure exerted on the matrix line by the jaw 3, this slight relaxation of the locking pressure exerted on the matrix line between first and second justifications allowing the customary horizontal alignment of the rear matrix lugs upwardly against the aligning ribs provided on the faces of the molds commonly used in these machines to take place freely and with the required certainty, it being understood that in machines of this class, the horizontal alignment of the matrices relatively to the mold is effected by a slight upward movement of the first elevator which takes place between the first and second justifications.

The second justification now takes place, during which the justification bar 51 ascends a second time, the justification bar during its second ascent occupying the horizontal position shown in Fig. 8, but since the pawl 36 is in locking position, the ascent of said bar will be restricted by the engagement of its roller 52 with the cam face 32 as shown in this figure, so that the bar 51 will not reach the wedges of spacebands if such are contained in the line, avoiding expansion of such spacebands and thus enabling narrow spacing to be obtained in quadded lines, which is desirable. Incident to second justification, the vise closing rod 58 is allowed to ascend under the action of its spring 108 so that the pin 57 thereon again moves out of engagement with the latch 53, and during this second ascent of the justification bar 51, the roller 52 acts on the cam face 32 on the lever 24 to apply driving pressure to the pawl 36 and the vise jaw 3 connected to the rack bar 5 with which the pawl 36 engages, and the jaw 3, which is the right hand vise jaw in the machine, is thereby clamped firmly, under the pressure thus applied, against the closed line of matrices, the roller 52 remaining in contact with the cam face 32 on the lever 24 and thereby maintaining the clamping or locking pressure on the line during the casting operation, the parts being shown in this position in Fig. 8.

Immediately following the cast, the justification bar 51 descends to its normal lowered position and the vise closing rod 58 is also caused to descend to its normal lowered position, the rod 58 descending this time to the full extent usually provided so that the pin 57 will bear on the shoulder 56 on the latch 53 and will rock this latch sufficiently far against the action of its spring 61 to cause disengagement of its inclined surface 60 from the cooperating inclined surface 59 on the pawl 36 and to cause the lower edge of the latch 53 to bear on the bottom of the recess 55 in the pawl 36, as shown in Figs. 3 and 4, thereby swinging the pawl 36 downwardly and disengaging its teeth 136 from the teeth 37 on the rack bar 5, the latch 53 thus lowering the pawl 36 sufficiently to enable the step 39 thereon to be restored to a position beneath the stop block 42 as the lever 24 swings toward the left in Fig. 8 under the action of its spring 27 and comes to rest with the lug 31 thereon against the stop block 30 on the vise frame. During this period of restoration of the parts just described, the pivoted stop 40, which rests freely on the step 38 on the pawl 36, descends by gravity to its normal position, as shown in Fig. 2, and the lug 44 on the stop pawl 43 carried by the rack bar 5 is then free to return to its normal position overlying the upper edge of the stop 40, as also shown in Fig. 2, it being understood that the jaw closing lever 8 is actuated, after the cast, by the engagement of the roller 174 with the portion 172 on the lever 17, to return the jaw 3 to its normal or fully opened position against the usual stop 103, preparatory to the sending of the next line into the casting mechanism. It will be understood that if a relatively short line such as shown in Fig. 8 but without expansible spacebands is composed and introduced between the vise jaws, the jaw 3 will close such a line and will clamp and lock it tightly for a cast therefrom by the pawl 36 acting under the influence of the roller 52 on the cam surface 32 of the lever 24, since the line would be sufficiently short to permit the lug 44 on the stop pawl 43 to advance sufficiently to clear the stop 40 during the closing movement of the jaw 3, thus permitting the teeth on the pawl 36 to engage the teeth 37 on the rack bar 5 and to act on the latter to clamp and lock the line as hereinbefore described, this action taking place in any case when the line is of a length which permits the jaw 3 to close sufficiently to carry the lug 44 of the stop pawl 43 beyond and clear of the stop 40.

Fig. 9 shows a line between the vise jaws which is considerably longer than the line shown in Fig. 8, it being of such length that notwithstanding the closing movement of the jaw 3 shown by the dotted and full lines, the pivoted stop pawl 43 on the rack bar 5 attached to this jaw has not been moved sufficiently far to the right in this figure to clear the stop 40, in view of which, as will be seen from Fig. 10, rise of the justification bar 51 and contact of the roller 52 thereon with the cam face on the lever 24 have failed to cause the pawl 36 to swing upwardly to bring its teeth into engagement with the teeth 37 on the rack bar 5. Although the step 39 on the pawl 36 has shifted sufficiently in Fig. 10 to clear the stop block 42, the step 38 on the pawl 36 still rests against the underside of the pivoted stop 40, and the pawl 36 is held against upward swing under the influence of the spring 46 acting on the pawl 36, by the lug 44 on the stop pawl 43 which overlies the stop 40, and hence the movement of the lever 24 to the right in Fig. 10 has failed to lock the vise jaw 3, so that the justification bar 51 will continue to rise in the usual manner and the spacebands in the line will expand the line against the jaw 3 and will move the latter toward the left in Fig. 10 and back against the usual jaw stop 103. The matrix line shown in Figs. 9 and 10 is an example which illustrates the action of the mechanism whereby lines which are assembled very nearly to full measure and contain the usual expansible spacebands will cast in the normal manner and to full length, provided such lines are sufficiently long to prevent the pivoted stop pawl 43 from moving sufficiently far during the closing movement of the jaw 3 to clear the pivoted stop 40, thus preventing the jaw 3 from being locked in the closed position to which it was moved by the lever 8 so that lines of such length will be filled out and justified to the full length of the slug measure being cast. However, if the line is substantially short of full measure so that the jaw 3 can move sufficiently far under the action of the lever 8 in closing against the line to carry the stop pawl 43 beyond the pivoted stop 40, the latter and the pawl 36 will then be permitted to rise, bringing the teeth 136 on the pawl 36 into engagement with the teeth 37 on the rack bar 5, thereby locking the jaw 3 against return to the usual fixed stop 103, and such lines will be quadded substantially in the manner described in connection with Fig. 8.

The slot and screw connection 140, 141 between the parts of the pivoted stop 40 enable this stop to be adjusted in the direction of movement of the rack bar 5 and the jaw 3 connected thereto to determine the extent of closing movement of the jaw 3 before such jaw becomes locked against return to its fully opened position by the pawl 36, to suit the requirements of the matter being composed and other desired conditions. For example, when matrix lines are being assembled to a given line measure, the operator fills the lines to within say 1 em of such line measure, the unfilled length of the line varying with different operators and according to how or where words can be broken properly at the ends of the lines and the lines thus assembled are caused to fill out to the exact line measure by the expansion of the expansible spacebands. With the stop 40 so adjusted, the jaw 3 and the rack 5 connected thereto may close against the line to the extent of 1 em while the stop pawl 43 remains in a position above the stop 40 so that the latter will hold the pawl 36 out of engagement with the teeth 37 on the rack 5 and thus permit the jaw 3 to return to its normal or fully opened position against the stop 103 by the expansion of the line under the action of the expansible spacebands, but closing movement of the jaw 3 greater than the distance of 1 em will carry the stop pawl 43 beyond and out of engagement with the stop 40 so that the latter may then be swung upwardly by the pawl 36 under the action of its spring 46, thus allowing the teeth 136 on said pawl to swing upwardly into engagement with the teeth 37 on the rack bar 5, and in such case, the actuation of the lever 24 by the ascent of the justifying mechanism will cause the jaw 3, then locked in closed position by the pawl 36, to clamp and lock the line, such line, being of less length than that predetermined by the setting of the stop 40, being automatically quadded. While setting lines of relatively shorter measure and which will usually contain a fewer number of expansible spacebands so that the total expansion of such lines will be less than that obtainable with longer lines, the stop 40 may be adjusted toward the left in Fig. 2 or toward the right in the machine while casting a considerable quantity of such shorter measure composition, so that the lug 44 on the stop pawl 43 will overlie only one-half of the upper edge of the stop 40 when the vise jaw 3 is in its normal or fully opened position, thus reducing the distance through which the jaw 3 may move toward the jaw 2 for such lines, for example, as may have only one or two spacebands therein and are assembled within say ½ em of full measure before the stop 40 is released by the stop pawl 43 so that the pawl 36 may move into locking engagement with the teeth of the rack bar 5 and thus prevent return of the jaw 3 to normal or fully opened position. While composing long lines such as those of 30 ems and which usually contain a sufficient number of spacebands to expand such lines to a correspondingly greater extent, the stop 40 may be adjusted toward the right in Fig. 2 or toward the left in the machine so that the lug 44 of the stop pawl 43 and the jaw 3 connected thereto may move a correspondingly greater distance during the closing of the jaw 3 before the lug 44 is carried beyond and releases the stop 40, thus permitting a greater closing movement of the jaw 3 while permitting return of this jaw to its fully opened position against the stop 103 by the expansive action of the spacebands in the line, although if the unfilled portion of the line is greater than the amount determined by the setting of the stop 40, the pawl 36 will be permitted to move into engagement with the rack bar 5 and thereby lock the jaw 3 in closed position and the pawl 36, under the action of the lever 24 and the justifying mechanism, will clamp and lock the line which will then be quadded.

Fig. 11 shows a matrix line between the vise jaws which line has been assembled without expansible spacebands, the line being shorter than the line measure for which the jaws 2 and 3 are set by the amount through which the jaw 3 has moved from the dotted to the full line position shown in this figure. In this case, the line is of sufficient length to prevent the stop pawl 43 from clearing the stop 40, as was the case in Fig. 9, but since there are no spacebands in the line in Fig. 11, the justification bar 51 can ascend without obstruction until the roller 52 contacts with the upper cam surface 33 on the lever 24 whereupon the rise of the justification bar will be arrested and at the same time the lever 24 and the pawl 36 connected thereto will be moved toward the right (Fig. 11) sufficiently far to carry the step 38 on the pawl 36 from beneath the stop 40, thereby releasing the pawl 36 so that it swings upwardly under the action of its spring 46, causing its teeth 136 to engage the teeth 37 on the rack bar 5. The roller 52 acting on the cam surface 33 then forces the lever 24 and pawl 36 toward the right in Fig. 11, thereby clamping the jaw 3 tightly against the line preparatory to the casting operation. The mechanism described thus enables a line without spacebands therein to be clamped and locked for casting therefrom and the casting from such lines will be accomplished automatically or without requiring adjustments or other attention by the operator.

While composing lines with or without expansible spacebands of full line measure or of short lines for quadding, as represented diagrammatically in Figs. 8 to 11 inclusive, the knob 23 is set in its raised position as shown in Fig. 2 so that the pinion 20 will be disengaged from the rack bars 4 and 5 and hence the jaw 3 will move toward the jaw 2 to close and clamp the line and return it to its normal fully opened position as described, while the jaw 2 remains substantially in its given or set position. However, when lines are to be centered so that the character bearing matrices therein will be positioned equidistantly from the ends of the mold slot, as in casting slugs for example for headings, the knob 23 is set in its lowered position as shown in Figs. 4 and 5, the consequent movement of the pinion 20 from its raised position as shown in Fig. 2 to its lowered position causing the stop pawl 43 to be deflected from the position shown in Fig. 3 to that shown in Figs. 4 and 5 as the pinion descends into mesh with the cooperating teeth on the rack bars 4 and 5 connected to the jaws 2 and 3 respectively, thereby removing the lug 44 on the stop pawl from position above the stop 40, as will be clear from Fig. 4, thus rendering the stop 40 inoperative to control the movement of the pawl 36 into locking engagement with the rack 5. With the pinion 20 thus set in mesh with the rack bars, the closing movement imparted by the lever 8 to the jaw 3 will be transmitted through the pinion to the jaw 2 so that both jaws will then move equal distances from their normal fully opened positions against the respective ends of the matrix line and will thereby center the matrix line equidistantly from the ends of the slots S in the mold. The ascent of the justifying mechanism which immediately follows causes the roller 52 acting on the cam surface 32 to advance the pawl 36 sufficiently to carry the step 39 on the latter from beneath the stop block 42 since lines to be centered are usually sufficiently short to permit closing movements of the jaws to an extent to release the pawl 36, so that the latter, being then free of control of the stop 40, swings into locking engagement with the teeth 37 on the rack bar 5 and acts thereon to clamp the jaw 3 against the matrix line and concurrently, through the pinion 20 and the rack bar 4, to clamp and lock the jaw 2 against the opposite end of the line, whether the line is with or without expansible spacebands, the operation being otherwise similar to that described in connection with Fig. 8.

Figs. 13, 14 and 15 show another embodiment of the adjustable stop or control means which is capable of being set more conveniently and with greater facility than the stop 40 hereinbefore described.

According to this embodiment of the invention, the pawl 36 is provided with a rigid upward extension 40ª, and the rack bar 5 is provided with a pawl 76 which is pivoted at the rear side thereof on a pivot pin or screw 77 so that this pawl may swing vertically above the part 40ª, and the rack bar 5 has a pin 78 fixed therein and arranged to operate in a vertical slot 79 in the pawl 76 to limit the downward swing thereof by gravity. The housing 22 on top of the vise cap and which contains the pinion shaft 21 has an annular or ring-like member 80 seated to rotate therein about the shaft 21 as an axis, and this member 80 has a pin 81 fixed thereto and projecting rigidly downwardly therefrom in rear of the vise cap so that its lower end will lie above and move in an arc which intersects the plane of the pawl 76, the pin 81 being thus arranged and adapted to bear on the upper edge of the pawl 76. Rotation of the ring-like member 80 serves to set the pin 81 in one or another of a number of different positions as represented for example in Fig. 14 by the full and dotted lines, these different set positions of the pin 81 being graduated in the direction in which the pawl 76 is advanced by the rack bar 5 incident to the closing movement of the jaw 3, and these graduated settings of the pin 81 corresponding to the varying amounts of the unfilled portions of the matrix lines when composed. For example, when the pin 81 occupies the position shown by the full lines in Fig. 14, it will be set for a matrix line in which no unfilled space has been left in the composing of the line, and the dotted line positions shown in this figure represent respectively the positions in which the pin 81 may be set for matrix lines in which 1, 2 or 3 ems space has been left unfilled therein during composition. The rotatable member 80 carrying the pin 81 is provided with an outwardly and upwardly extending lug 84 which provides a handle which is readily accessible at the top of the vise cap and serves as convenient means for the rotation of the member 80 to set the pin 81 thereon, and this lug as shown carries a pointer which is arranged to register with a scale 85 arranged on the base 83 of the housing and graduated to conform with the graduated settings of the pin 81.

The rest of the mechanism according to this embodiment of the invention is the same in construction and mode of operation as that hereinbefore described, with the exception that the upper cam surface 33 on the lever 24, used in the first described embodiment of the invention, is omitted as unnecessary, as will hereinafter appear.

According to the embodiment shown in Figs. 13 to 15 inclusive, when the vise jaws are in their normal fully opened position and the justification bar 51 is in its normal lowered position, the step 39 on the pawl 36 will bear against the underside of the stop block 42 and will be thereby held in disengaged relation with the teeth 37 on the underside of the rack bar 5, and the rigid upward extension 40ª on the pawl 36 will underlie the pawl 76 carried by the rack bar 5, as shown in Fig. 13. The handle 84 is manipulated to set the pin 81 according to the amount of unfilled space to be left in the lines during composition, as may be desired by the operator or determined by the line measure of the lines being composed, and such setting of the pin 81 will accordingly determine the extent of closing movement of the jaw 3 that may take place before the pawl 36 may swing upwardly into locking engagement with the rack bar 5, the pin 81 remaining above the pawl 76 and thereby preventing upward rack bar engaging movement of the pawl 36 when the vise jaw 3 closes against lines which have been set sufficiently full to conform with the setting of the pin 81 so that while casting from such lines the vise jaw 3 will not become locked by the pawl 36 but may return to its fully opened position against its stop 103 under the expansion of the line by the justification of the expansible spacebands contained therein, so that such lines will be of full length or line measure when the casts are made therefrom. However, if a matrix line is not filled to an extent corresponding to the setting of the pin 81, the vise jaw 3, in closing against such a line, will move sufficiently far to carry the pawl 76 from beneath the pin 81, and the pawl 76 will then be free to swing upwardly under the pressure of the extension 40ª on the pawl 36 acting under the pull of the spring 46, thus permitting the teeth 136 on said pawl to move into engagement with the teeth 37 on the rack bar 5, and during the immediately following rise of the justification bar 51, the roller 52 thereon, coming into contact with the inclined cam face 32 on the lever 24, will swing the latter and the pawl 36 toward the right in Fig. 13, carrying the step 39 on the pawl 36 from beneath the stop block 42 and thereby causing the pawl 36 to engage the rack bar 5 and to act thereon to force the jaw 3 toward the jaw 2 and to lock it in closed position against the matrix line, the matrix line in such case being quadded and locked while the cast is being made therefrom. The selected settings for the stop pin 81 will depend upon how much unfilled length of the lines the operator desires to allow during the composition thereof, and this depends upon the thickness of the spacebands, the style of type face and whether wide or narrow spacing between the words in the lines is desired. All lines filled to the length corresponding to the setting of the pin 81 and containing spacebands will be automatically expanded to full length or line measure, since the pawl 76 will then not be advanced sufficiently during the jaw closing movement of the rack bar 5 to pass from beneath the pin 81, and hence said pawl 76 will be beneath and held down by the pin 81 and the pawl 36 held from locking engagement with the rack bar 5 when the roller 52 rides on the cam surface 32 during expansion of spacebands in the line to effect justification. Any lines whether with or without expansible spacebands but not filled to an extent corresponding to the setting of the stop pin 81 will be quadded automatically, since the pawl 76 will then advance beyond the stop pin 81 during the line closing movement of the jaw 3, thus freeing the pawl 36 from control by said pin, and the roller 52 during the immediately following rise of the justification bar, will act on the cam surface 32 of the lever 24 to move the latter and the pawl 36 toward the right in Fig. 13, thus carrying the step 39 on pawl 36 from beneath the stop block 42 and causing the pawl 36 to engage the rack bar 5 to lock the jaw 3 against the line before the spacebands in the line have been driven upwardly more than a slight amount, the cam 32 on the lever 24 being shaped to impart sufficient movement to the pawl 36 to cause it to lock the jaw 3 approximately at the same time that the justification bar 51 comes into contact with the lower ends of the wedges of the expansible spacebands, when such are present in the line. Therefore, irrespective of the number of spacebands that may be contained in any short lines, all of the spacebands in such lines will be driven upwardly the same amount or distance so that the space produced by the spacebands between the words in every quadded or centered line will always be the same.

When the stop pin 81 is in the zero position represented by the full lines in Fig. 14, it is clear of the pawl 76 while the jaw 3 is in its fully opened position so that as soon as the roller 52 on the justifying mechanism acts upon the lever 24 and moves it and the pawl 36 to the right in Fig. 13, the step 39 on the pawl 36 will be carried clear of the stop block 42 and the teeth 136 may then swing immediately into locking engagement with the teeth 37 on the rack bar 5, and with such a setting of the stop pin 81, all lines received between the vise jaws, whether or not they contain spacebands, will be closed, clamped and quadded, and a line containing spacebands and assembled to almost full length will not justify to full measure, since the roller 52 will then act upon the lever 24 as soon as the justification bar rises and the pawl 36 will thus be moved to the right in Fig. 13 from beneath the stop block 42 and will engage the rack bar 5 and lock the vise jaw 3 against the line before the spacebands, if such are present in the line, have been driven upwardly more than a slight amount. The closing and clamping of nearly full lines without spacebands, made possible by the setting of the stop pin 81 at zero, renders unnecessary the use of the second cam surface 33 on the lever 24 as in the first described embodiment.

It will be understood that while casting from full length or quadded lines, the knobs 23 will be set in its raised position so that the pinion 20 is in disengaged relation with the rack bars 4 and 5 whereby the vise jaw 3 may close and open independently of the jaw 2, the lines being expanded to full length or quadded automatically or without requiring any attention on the part of the operator beyond the setting of the stop pin 81 according to the nature of the composition, and the amount of line expansion to be allowed.

When it is desired to center a line, the knob 23 is lowered to carry the pinion 20 connected thereto into engagement with the rack bars 4 and 5 so that the jaws 2 and 3 will be connected for simultaneous movement to equal extents against the respective ends of the line whereby, during the jaw closing action of the lever 8, the jaws will act on the line to center it equidistantly from the ends of the slug casting mold, and the jaw clamping force applied by the pawl 36 to the rack bar 5 will be transmitted to both jaws through the interposed connecting pinion 20. While centering lines, the stop pin 81 may be set in zero position or in any position above zero, and returning of the knob 23 to raised position will disengage the pinion 20 from the rack bars 4 and 5 and thereby restore the mechanism for casting automatically from full length or quadded lines.

Figs. 16 to 19 inclusive show another feature of the invention which enables lines of different lengths, with or without spacebands, to be quadded at the left hand ends thereof when it is desirable to indent such ends of the lines as, for example, to accommodate cuts at the left hand side of the column of the printed matter, indented quotations and the like, such quadding being accomplished by closing the left hand vise jaw against the matrix lines while the right hand jaw remains in its normal or full line position.

According to this feature of the invention, the right hand vise jaw 3 is provided with means for connecting or disconnecting it with respect to its closing and clamping rack, such means as shown comprising a locking pin 150 which is slidable longitudinally in a bore 151 formed in and extending transversely of the right hand jaw block 7 and has a lug 152 extending downwardly therefrom through a transverse slot 153 in the block 6 into a position beneath the latter where it may engage the forked end 154 of a controlling lever 155, the latter being pivotally mounted by the pin 156 on the under side of the vise cap 1. The right hand jaw operating rack 5 is movable longitudinally relatively to the jaw block 7 and past one end of the locking pin 150 and is provided with a locking aperture 157 to receive the rear end of said pin instead of being fixed to the right hand jaw as in the previously described construction. The vise cap 1 is provided with a locking aperture 158 to register with and receive the forward end of the locking pin 150 when the right hand jaw is in its normal or fully open position. The retaining latch 18$^a$, for the right hand jaw is arranged to engage a notch 159 in the jaw closing rack bar 5 instead of directly engaging the right hand jaw, as in the previously described construction. Also, according to this embodiment of the invention, the pinion engaging teeth on the rack bar 4 connected to the left hand vise jaw 2 are wider or higher than those of the rack bar 5, so that the pinion 20 always remains in mesh with this rack bar, even when the pinion is fully raised or retracted to disengage it from the rack bar 5. This embodiment of the invention, with the above noted exceptions, is the same in construction as that hereinbefore described.

The operation according to this embodiment of th invention is as follows:—

When the pin 150 is moved by the lever 155 into the aperture 158 in the vise cap, as shown in Fig. 16, the right hand vise jaw 3 will be bolted to the vise cap and thus locked in its normal fully open position, while the rear end of the pin 150 will be withdrawn from the aperture 157 in the right hand jaw closing rack bar 5 and the latter will then be disconnected from the right hand jaw. With the lever 155 in this position as shown in Fig. 16 and the pinion 20 lowered to mesh with both rack bars 4 and 5, when a short line of matrices, with or without spacebands, is delivered between the vise jaws by the first elevator, as hereinbefore described, the first elevator will trip the latch 18$^a$ and thus release the rack bar 5, and the jaw closing lever 8, actuated as hereinbefore described, will then move the rack bar 5 and, through rotation of the pinion 20, the rack bar 4 connected to the left hand vise jaw 2, and will thus move the left hand jaw from the full line receiving position in which it is set, as indicated by the dotted lines in Fig. 18, toward the right hand jaw, and thereby close the matrix line between the jaws as shown by the full lines in this figure, and the locking pawl 36, actuated in the manner hereinbefore described, will then act on the rack bar 5 and, through the pinion 20, on the rack bar 4 to clamp and lock the left hand vise jaw against the closed line preparatory to the casting operation. If the pinion 20 is not engaged with both of the rack bars, in which event the rack bar 5 will move freely and without rotating the pinion, the justifying mechanism which actuates the pawl 36 will advance to its full extent and thereby operate the usual pump stop to prevent a cast from the loose or unclosed line.

When the pin 150 is shifted by the lever 155 into the position shown in Fig. 17, its forward end is withdrawn from the aperture 158 in the vise cap and its rear end is engaged in the aperture 157 in the rack bar 5, so that the latter is then connected to the right hand vise jaw and said jaw is unlocked from the vise cap. If the pinion 20 is then lowered to engage both rack bars 4 and 5, both jaws will be closed or moved toward one another by the jaw closing lever 8 to center the matrix line and will be clamped against the line by the pawl 36, and if the pinion is in raised position so that it is disengaged from the rack bar 5, then only the right hand jaw will close toward the left hand jaw to quad out the right hand end of the line and clamp it, when short matrix lines are sent in, and the lever 155 will occupy the position shown in Fig. 17 when full length lines are to be sent in, in which event the right hand jaw will be returned to its fully open position against the usual right hand jaw stop by the expansion of the line to full measure by the spacebands, as hereinbefore described.

The rack bar 5 thus constitutes a power member which may be connected either to one or the other of the jaws or to both of the jaws to close either or both jaws against a matrix line between the jaws.

By extending the teeth of the rack bar 4 somewhat higher than those of the rack bar 5, as shown in this embodiment of the invention (Fig. 19), the pinion will always remain in engagement with the rack bar 4, thus insuring instant registration and mesh of the teeth of the pinion with the teeth of the rack bars at any time since it is only necessary to bring the pinion into mesh with one of the rack bars. A further advantage of this feature is that the pinion is always in engagement with the rack bar 4 which latter is connected to the left hand jaw, this jaw being commonly known as the adjustable jaw which is adjustable by the jaw setting device 102 for casting slugs of different line measures, so that the pinion will remain in engaging relation with the rack bar 4 for all settings of the left hand jaw.

The control means provided by the present invention enables the quadding and centering device to be readily set to allow different amounts of expansion space to be filled out in the lines by expansion of the spacebands when such are used, according to whether wide or narrow spacing between the words in the lines is desired, the line measure or column width for which the machine is set, or other conditions, so that the machine will automatically fill out and justify to full length or line measure all lines composed to a length equal to or greater than the length for which the control means is set and will automatically quad all lines, whether or not they contain spacebands, which are composed to a length less than that corresponding to the setting of the control means, such for example as short lines at the ends of paragraphs, and all lines, whether with or without spacebands, will be tightly clamped for the casting of type slugs therefrom. Since the line clamping means operates immediately prior to the part of the stroke of the justifying mechanism which expands the spacebands, and its design is such that it can be made to control the extent of operation of the justifying mechanism as desired, so that it may cause the usual justification of the spacebands in full lines but may avoid justification of the spacebands in short or quadded lines, relatively narrow spacing may be obtained between the words of quadded lines to substantially match that in full lines, and the resistance offered by the clamping means after tightly clamping short or quadded lines with spacebands or lines without spacebands limits the operating stroke of the justifying mechanism, so that the usual pump stop as commonly used on machines of this class may be employed under control of the justifying mechanism to allow casts to be made if the lines are tightly clamped and to prevent a cast taking place from loose lines in which cases the justifying mechanism will rise freely or beyond the normal range of operation. Since the jaw clamping and locking pawl is disengaged from or in inactive relation with the movable jaw while the latter is operated to close against short matrix lines, excessive wear of said pawl and the teeth or cooperating parts is avoided.

I claim as my invention:

1. In a line composing and type casting machine having a vise embodying opposed jaws adapted to be set to receive full length matrix lines between them, at least one of said jaws being movable toward the other jaw to close against a short length matrix line, locking means for said movable jaw having means for normally holding it in inactive relation therewith, and means operative to actuate said locking means to release it from its holding means for movement into active relation with said movable jaw and cause it to act on said jaw to force it from short line closing position toward the other jaw to clamp and lock such short length matrix line endwise.

2. In a line composing and type casting machine having a vise embodying opposed relatively movable jaws to receive full length and short length matrix lines between them, means for moving at least one of said jaws toward the other jaw to close against a short length matrix line, and justifying means for expanding spacebands when such are present in the lines, locking means for said movable jaw having means for normally holding it in inactive relation therewith, and means actuated by the justifying means and operative to release said locking means from its holding means for movement into active relation with said movable jaw and cause it to act on said jaw to force it from short line closing position toward the other jaw to clamp such short length matrix line endwise.

3. In a line composing and type casting machine having a vise embodying opposed jaws adapted to be set to receive full length matrix lines between them, at least one of said jaws being movable toward the other jaw to close against a short length matrix line, and justifying means for expanding spacebands when such are present in the line, a locking member for said movable jaw having means for normally holding it in inactive relation therewith, and a cam cooperative with the justifying means and actuated thereby to release said locking member from its holding means and permit it to be moved into active relation with said movable jaw and cause it to act on said jaw while it is in short line closing position to force it from such position toward the other jaw to clamp a matrix line endwise.

4. In a line composing and type casting machine having a vise embodying opposed jaws adapted to be set to receive full length matrix lines between them, at least one of said jaws being movable toward the other jaw to close against a short length matrix line, locking means for said movable jaw, means for actuating said locking means to force the movable jaw toward the other jaw to clamp a matrix line, and a controlling device for said locking means capable of being set in accordance with different amounts of unfilled portions to be left in the composition of the matrix lines and governing correspondingly the line clamping action of the locking means on said movable jaw.

5. In a line composing and type casting machine having a vise embodying opposed jaws adapted to be set to receive full length matrix lines between them, at least one of said jaws being movable toward the other jaw to close against a short length matrix line, means for moving the movable jaw toward the other jaw to clamp a matrix line endwise between the jaws, and controlling means capable of being set in accordance with the extents of the unfilled portions to be left in the lengths of the composed lines and operative to prevent action of said jaw moving means on said movable jaw when lines filled to or beyond the lengths according to which the controlling means is set are between the jaws and to permit action of said jaw moving means on the movable jaw to clamp between the jaws lines filled to less than such lengths.

6. In a line composing and type casting machine having a vise embodying opposed jaws adapted to be set to receive full length matrix lines between them, at least one of said jaws being movable toward the other jaw to close against a short length matrix line, a movable locking member for said movable jaw, means for moving said locking member to force the movable jaw toward the other jaw to clamp a matrix line endwise between the jaws, and a controlling member for governing the action of the locking member on said movable jaw and adjustable to render the locking member active on the movable jaw at different selected points in the closing movement of said movable jaw.

7. In a line composing and type casting machine having a vise embodying opposed jaws adapted to be set to receive full length matrix lines between them, at least one of said jaws being movable toward the other jaw to close against a short length matrix line and having a toothed member connected thereto, a movable locking pawl to cooperate with said toothed member, means for moving said locking pawl while engaged with said toothed member to force said movable jaw toward the other jaw to clamp a matrix line endwise between the jaws, and a controlling device capable of being set in accordance with the unfilled portions left in the lengths of the composed lines and governing correspondingly the point in the closing movement of the movable jaw at which said locking pawl engages said toothed member to act upon it and the movable jaw.

8. In a line composing and type casting machine having a vise embodying opposed jaws adapted to be set to receive full length matrix lines between them, at least one of said jaws being movable toward the other jaw to close against a short length matrix line, and justifying means for expanding spacebands when such are present in the lines, locking means actuated by the justifying means and arranged to act on said movable jaw to clamp it against a line between the jaws, control means for holding said locking means in inactive condition while the movable jaw is closing to a predetermined limit and for permitting action of the locking means on said movable jaw when the latter closes beyond such limit, and a part on the locking means arranged to be acted on by the justifying means while the latter is expanding spacebands in the line for forcing the movable jaw toward the other jaw to clamp a line between the jaws and to thereby restrict the operation of the justifying means.

9. In a line composing and type casting machine having a vise embodying opposed jaws adapted to be set to receive full length matrix lines between them, at least one of said jaws being movable toward the other jaw to close against a short length matrix line, and justifying means for expanding spacebands in matrix lines, locking means arranged to act on said movable jaw to clamp it against a line between the jaws, control means for holding said locking means in inactive condition while the movable jaw is closing on a line of predetermined length and for permitting said locking means to act on the movable jaw when the latter closes on a line of shorter length, and actuating means between the justifying means and locking means for actuating the latter while held in inactive condition to avoid clamping a line of such predetermined length and thereby permit the justifying means to expand spacebands in such line, and for actuating said locking means while acting on the movable jaw to clamp a relatively shorter line and thereby restrict the expansion of spacebands in such shorter line.

10. In a line composing and type casting machine having a vise embodying opposed jaws adapted to be set to receive full length matrix lines between them, at least one of said jaws being movable toward the other jaw to close against a short length matrix line, and justifying means for expanding spacebands when such are present in the line, locking means having a portion arranged to be engaged and actuated by the justifying means and active on said movable jaw to clamp it against a line between the jaws, and control means adjustable to hold said locking means in inactive relation with the movable jaw while the latter is closing to different predetermined extents according to the adjustments of said control means and to permit the locking means to act on the movable jaw when the latter closes beyond such extents or to permit the locking means to act on said movable jaw while the latter is in fully open position, the portion of the locking means engaged by the justifying means restricting the operation of the justifying means while the locking means is in active relation with said movable jaw.

11. In a line composing and type casting machine having a vise embodying opposed jaws adapted to be set to receive full length matrix lines between them, at least one of said jaws being movable toward the other jaw to close against a short length matrix line, locking means for said movable jaw, means for actuating said locking means to force the movable jaw toward the other jaw to clamp a matrix line, a controlling device for said locking means capable of being set in accordance with different amounts of unfilled portions to be left in the lengths of the composed lines and governing correspondingly the line clamping action of the locking means on the movable jaw, and an indicator cooperative with said controlling device and indicating the settings thereof.

12. In a line composing and type casting machine having a vise embodying opposed jaws adapted to be set to receive full length matrix lines between them, at least one of said jaws being movable toward the other jaw to close against a short length matrix line, and justifying means operative successively to expand spacebands when such are present in the line, locking means actuated by the justifying means to force the movable jaw toward the other jaw to clamp a line endwise between the jaws, and means for holding the locking means in active relation with the movable jaw between the successive operations of the justifying means.

13. In a line composing and type casting machine having a vise embodying opposed jaws adapted to be set to receive full length matrix lines between them, at least one of said jaws being movable toward the other jaw to close against a short length matrix line, and justifying means operative successively to expand spacebands when such are present in the line, a locking pawl engageable with the movable jaw and actuated by the justifying means to force the movable jaw toward the other jaw to clamp a line endwise, and a latch cooperative with the locking pawl to hold it in engagement with the movable jaw during the interval between the successive operations of the justifying means.

14. In a line composing and type casting machine having a vise embodying opposed jaws adapted to be set to receive full length matrix lines between them, at least one of said jaws being movable toward the other jaw to close against a short length matrix line, and justifying means operative successively to expand spacebands when such are present in the line, locking means actuated by the justifying means to force the movable jaw toward the other jaw to clamp a line endwise, a latch cooperative with the locking means to hold it in active relation with the movable jaw, and means for moving said latch to relax the clamping pressure on the line between the jaws during the interval between the successive operations of the justifying means.

15. In a line composing and type casting machine having a vise embodying opposed jaws adapted to be set to receive full length matrix lines between them, at least one of said jaws being movable toward the other jaw to close against a short length matrix line, and justifying means operative successively to expand spacebands when such are present in the line, a toothed member connected to the movable jaw, a toothed locking pawl movable into engagement with said toothed member and actuated by the justifying means to force the movable jaw toward the other jaw to clamp a line, a latch having means for actuating it to hold said pawl in engagement with said toothed member, and means for moving said latch, during the interval between the successive justifying operations of the justifying means, to relax the clamping pressure applied to the line.

16. In a line composing and type casting machine having a vise embodying opposed jaws adapted to be set to receive full length matrix lines between them, at least one of said jaws being movable toward the other jaw to close against a short length matrix line, locking means for said movable jaw having means for normally holding it in inactive relation therewith, means for actuating the locking means to release it from its holding means for movement into active relation with the movable jaw and to force said jaw toward the other jaw to clamp a line, a latch operative to hold said locking means in active relation with the movable jaw, means operative on said latch to retract it sufficiently to relax the clamping force applied to the line by the locking means and also operative to retract said latch to a further extent, and means operative by such further retraction of said latch to render the locking means inactive with respect to the movable jaw.

17. In a line composing and type casting machine having a vise embodying opposed jaws both of which are movable to receive matrix lines of different lengths between them, means connecting said jaws and operative to simultaneously move them equal distances toward one another to close against and center a matrix line lengthwise, locking means for said jaws having means for normally holding it in inactive relation therewith to permit opening and closing movements of said jaws, and means operative to release said locking means from its holding means for movement into active relation with said jaws and to act thereon to force them toward one another to clamp a matrix line between them.

18. In a line composing and type casting machine having a vise embodying right and left hand jaws, the right hand jaw being movable toward the left hand jaw to close against matrix lines of different lengths, justifying means comprising a justification bar to engage and expand spacebands in the line, and means for successively advancing said bar to effect first and second justifications, said means advancing said bar during first justification while said bar is inclined downwardly from the left hand jaw toward the right hand jaw.

19. In a line composing and type casting machine having a vise embodying right and left hand jaws, the right hand jaw being movable toward the left hand jaw to close against matrix lines of different lengths, justifying means comprising a justification bar to engage and expand spacebands in the line, and means for successively advancing said bar to effect first and second justifications, said means advancing said bar during first justification while said bar is inclined downwardly from the left hand jaw toward the right hand jaw and supporting said bar in horizontal position during second justification.

20. In a line composing and type casting machine having a vise embodying opposed jaws both movable toward one another, rack bars connected to the respective jaws, and an axially movable pinion for connecting the rack bars, one of said rack bars being always in mesh with said pinion and the other rack bar being engageable and disengageable by the axial movements of the pinion.

21. In a line composing and type casting machine having a vise embodying opposed jaws both movable toward and from one another, one of said jaws having means for setting it for different length matrix lines, rack bars connected to the receptive jaws, the rack bar connected to the jaw having the setting means being wider than the other rack bar, and an axially movable pinion for connecting the rack bars, said pinion being adapted to remain in constant mesh with said wider rack bar and its axial movement carrying it into and out of mesh with the other rack bar.

22. In a line composing and type casting machine, justifying means for justifying spacebands in matrix lines comprising a justification bar to engage and act on the spacebands, a pair of reciprocatory actuating rods pivotally connected to the respective ends of said bar, and a member pivotally connected to the actuating rod to which one end of said bar is connected and having a movable connection with the other end of said bar, said connection being operative to alter the height of the respective end of the bar by movement of said member about its pivot.

23. In a line composing and type casting machine, justifying means for justifying expansible spacebands in matrix lines comprising a justification bar to engage and act on the spacebands, a pair of actuating rods pivotally connected to the respective ends of said bar, a member pivotally connected to the actuating rod which is connected to one end of said bar and movably engaging the other end of said bar to support the latter end of the bar at different heights with respect to its other end, and means actuated by the other actuating rod for moving said member to alter its supporting relation with said bar.

24. In a line composing and type casting machine, justifying means for justifying expansible spacebands in matrix lines comprising a justification bar to engage and act on the spacebands, a pair of actuating rods pivotally connected to the respective ends of said bar, a member pivotally connected to the actuating rod which is connected to one end of said bar and having an inclined slot and pin connection with the other end of said bar to support the latter end of the bar at different heights with respect to its other end when said member swings about its pivot.

25. In a line composing and type casting machine, justifying means for justifying expansible spacebands in matrix lines comprising a justification bar to engage and act on the spacebands, a pair of actuating rods pivotally connected to the respective ends of said bar, a member pivotally connected to the actuating rod which is connected to one end of said bar and movably engaging the other end of said bar to support the latter end of the bar at different heights with respect to its other end, and a lever pivoted on the other actuating rod and having means for swinging it against said member to move the latter from one supporting relation with said bar into a different supporting relation therewith.

26. In a line composing and type casting machine, justifying means for justifying expansible spacebands in matrix lines comprising a justification bar to engage and act on the spacebands, actuating rods for successively advancing said bar, a pivoted member operative to support said bar in inclined position during one advance thereof, means operative after the next following descent of said bar to move said member into a position to permit said bar to occupy a horizontal position during its next advance, and means acting during the next following descent of said bar to restore said members to position to support said bar in inclined position.

27. In a line composing and type casting machine, justifying means for justifying expansible spacebands in matrix lines comprising a justification bar to engage and act on the spacebands, actuating rods for successively advancing said bar, a pivoted member operative to support said bar in inclined position during one advance thereof, and means operative after the next following descent of said bar to act on said member to force said bar into horizontal position and clamp it in such position during its next advance.

28. In a line composing and type casting machine, justifying means for justifying expansible spacebands in horizontal matrix lines comprising a justification bar to engage and act on the spacebands, a pair of actuating rods for successively advancing said bar, a pivoted member connected to one of said rods and movable into positions to support said bar in inclined or in horizontal position, said member cooperating with one of said rods to form a frame to support said bar in inclined position during one advance thereof and cooperating with the other rod to form a frame to rigidly support and lock said bar in horizontal position during the succeeding advance thereof.

29. In a line composing and type casting machine, the combination of a pair of line confining jaws both movable in a direction toward one another, an actuating device for moving said jaws, a connecting member connected to said device to be actuated thereby, said member being common to both jaws and movable in parallelism with said direction of movement thereof, means for connecting said member to one of said jaws for moving it and for disconnecting it from said jaw and locking said jaw against movement, and means for connecting said member to and disconnecting it from the other jaw.

30. In a slug casting machine having a pair of line confining jaws movable equidistantly from full line receiving position toward each other for centering a line, and justifying means for expanding spacebands in the line, the combination of means for effecting such centering movement of the jaws, means for locking the jaws in their centering position, and means cooperative with said locking means to render said locking means ineffective and thereby permit outward movement of the jaws to full line receiving position when a full line is expanded by spacebands.

SAMUEL E. SPERRY.